US011813642B2

(12) United States Patent
Semperlotti et al.

(10) Patent No.: US 11,813,642 B2
(45) Date of Patent: Nov. 14, 2023

(54) PHONONIC SYSTEM AND METHOD OF MAKING THE SAME

(71) Applicant: Purdue Research Foundation, West Lafayette, IN (US)

(72) Inventors: Fabio Semperlotti, West Lafayette, IN (US); Ting-Wei Liu, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 1294 days.

(21) Appl. No.: 16/046,982

(22) Filed: Jul. 26, 2018

(65) Prior Publication Data

US 2019/0039093 A1    Feb. 7, 2019

Related U.S. Application Data

(60) Provisional application No. 62/536,985, filed on Jul. 26, 2017.

(51) Int. Cl.
*B06B 3/00*   (2006.01)
*H02N 2/18*   (2006.01)
*B06B 1/18*   (2006.01)
*G10K 11/24*  (2006.01)

(52) U.S. Cl.
CPC .............. *B06B 3/00* (2013.01); *B06B 1/18* (2013.01); *G10K 11/24* (2013.01); *H02N 2/186* (2013.01)

(58) Field of Classification Search
CPC ................................. B06B 3/00; B06B 1/18
USPC ........................................................ 156/73.1
See application file for complete search history.

(56) References Cited

U.S. PATENT DOCUMENTS 9,502,632 B2 *  11/2016  Hielscher ............... H01L 41/04

OTHER PUBLICATIONS

Pal, Raj Kumar et al., "Edge waves in plates with resonators: an elastic analogue of the quantum valley Hall effect." New Journal of Physics 19.2 (2017): 025001.
Vila, Javier et al., "Observation of topological valley modes in an elastic hexagonal lattice." Physical Review B 96.13 (2017): 134307.

* cited by examiner

*Primary Examiner* — James D Sells
(74) *Attorney, Agent, or Firm* — Purdue Research Foundation

(57) ABSTRACT

A system includes a first structure, wherein the first structure lacks space inversion symmetry, and wherein the first structure includes a first elastic lattice. The system further includes a second structure, wherein the second structure lacks space inversion symmetry, and wherein the second structure includes a second elastic lattice. Additionally, the system includes the first structure coupled to the second structure such that the first structure and the second structure have a mirror symmetry to each other.

22 Claims, 6 Drawing Sheets

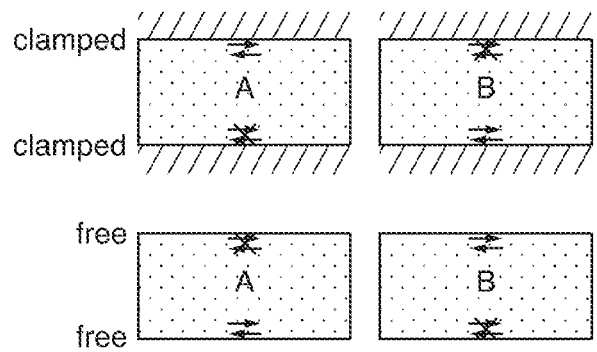
Figure 5
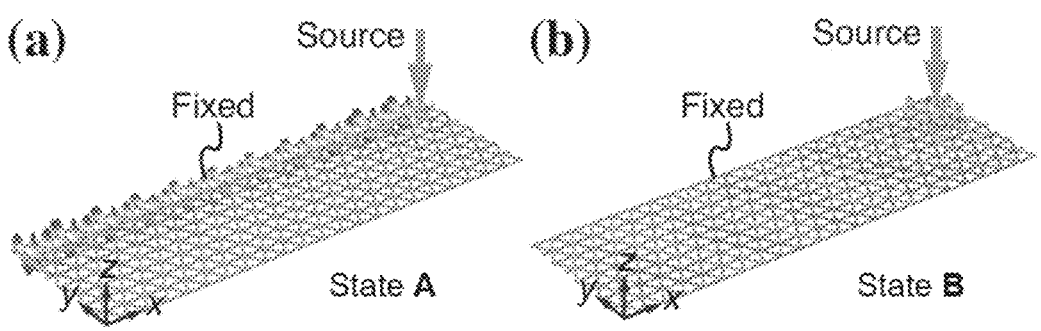
Figure 6(a)     Figure 6(b)
Figure 6

PHONONIC SYSTEM AND METHOD OF MAKING THE SAME

PRIORITY PARAGRAPH

This application claims priority to U.S. Provisional Patent Application Ser. No. 62/536,985 filed Jul. 26, 2017 entitled Phononic system and method of making the same.

GOVERNMENT FUNDING PARAGRAPH

This invention was made with government support under FA9550-15-1-0133 awarded by Air Force Office of Scientific Research. The government has certain rights in the invention.

TECHNICAL FIELD

The present application relates to phononic systems, and more specifically, to topological phononic systems that transport acoustic/elastic energy.

BACKGROUND

Elastic waveguides have important applications in vibration and noise control facilities. They continue to be highly sought-after as demand for acoustic energy harvesting technology is bolstered by green energy demand. Elastic waveguides can also be used in ultrasonic biomedical devices such as the acoustic scalpel. They can also be used in telecommunication devices where transporting radio frequency (RF) acoustic signal with low loss is critical.

Accordingly, there is a need for high efficient elastic waveguide with low energy loss.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry, various features may not be drawn to scale and are used for illustration purposes only. In fact, the dimensions of the various features in the drawings may be arbitrarily increased or reduced for clarity of discussion.

FIG. 1(a) illustrates a phononic structure in accordance with one or more embodiments. FIG. 1(b) illustrates a phononic structure in accordance with one or more embodiments. FIG. 1(c) illustrates a phononic structure in accordance with one or more embodiments

FIG. 3(a) illustrates a calculated dispersion band structures of phononic lattice in accordance with one or more embodiments. FIG. 3(b) illustrates a calculated dispersion band structures of phononic lattice in accordance with one or more embodiments.

FIG. 4(a) illustrates a lattice structure in accordance with one or more embodiments. FIG. 4(b) a set of domain wall configurations in accordance with one or more embodiments. FIG. 4(c) illustrate dispersion curves in a phononic superlattice, in accordance with one or more embodiments. FIG. 4(d) illustrates field simulations of an edge state along a straight DW. FIG. 4(e) illustrates field simulations of an edge state along an arbitrary-shaped DW.

FIG. 5 illustrates consequences of edge notes in accordance with one or more embodiments.

FIG. 6. FIG. 6(a) illustrates results of numerical experiments in accordance with one or more embodiments. FIG. 6(b) illustrates results of numerical experiments in accordance with one or more embodiments.

SUMMARY

Figure 1:
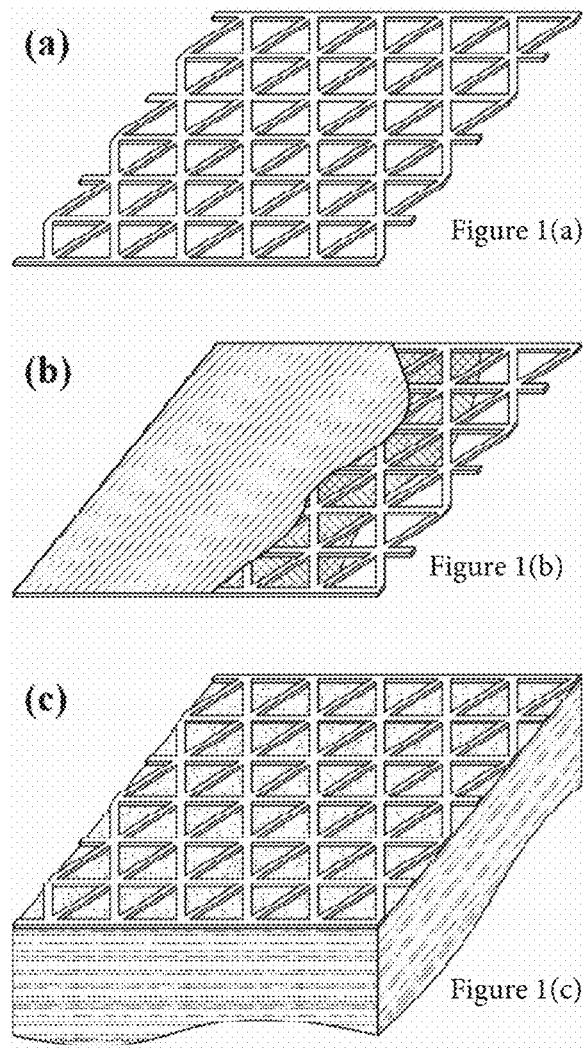
FIG. 1.

One aspect of the present application relates to a system including a first structure, wherein the first structure lacks space inversion symmetry, and wherein the first structure includes a first elastic lattice. The system further includes a second structure, wherein the second structure lacks space inversion symmetry, and wherein the second structure includes a second elastic lattice. Additionally, the system includes the first structure coupled to the second structure such that the first structure and the second structure have a mirror symmetry to each other.

Another aspect of the present application relates to system including a vibrational source. Moreover, the system includes a first structure, wherein the first structure lacks space inversion symmetry, and wherein the first structure includes a first elastic lattice. The system further includes a second structure, wherein the second structure lacks space inversion symmetry, and wherein the second structure includes a second elastic lattice. Additionally, the system includes the first structure coupled to the second structure such that the first lattice and the second lattice have a mirror symmetry to each other. Further, the system includes an interface of the first structure and the second structure, wherein the interface is configured to propagate a unidirectional wave from the vibrational source.

Still another aspect of the present application relates to a system including a first structure, wherein the first structure lacks space inversion symmetry, and wherein the first structure includes a first elastic lattice. The system further includes a second structure, wherein the second structure lacks space inversion symmetry, and wherein the second structure includes a second elastic lattice. Additionally, the system includes the first structure coupled to the second structure such that the first structure and the second structure have a mirror symmetry to each other. Further, the system includes an interface of the first structure and the second structure, wherein the interface is configured to propagate a unidirectional wave.

In one or more embodiments, a phononic structure is a combination of an elastic waveguide and an elastic-wave-forbidden structure. The phononic structure is an inhomogeneous elastic structure satisfying translation symmetry with periodically varying mechanical properties such as 1) geometric shape; 2) elastic stiffness; 3) mass density; and 4) mechanical supporting conditions, or other conditions affecting the equivalent mechanical properties such as periodic electric/magnetic/temperature fields applied on piezoelectric, magnetoelastic, electrostrictive, magnetostrictive solids, or shape memory alloys. A designed path in the phononic structure along which an elastic wave propagates suppresses back-scattering, therefore resulting in very low loss or attenuation. Notwithstanding the above, the other remaining regions of the phononic structure (i.e. elastic-wave-forbidden structure) are free from vibration or noise, because elastic waves are unable to propagate therein.

In various embodiments, the phononic structure operates on a theory of topological acoustics. The theory of topological acoustics is analogous to the elastic wave of quantum valley Hall effect. It indicates that phononic structures with lack of inversion symmetries are capable of supporting acoustic edge modes, thereby suppressing back-scattering and forbidding wave propagation in the bulk interior. Depending on the embodiment, the phononic structure can be of any solid material that supports elastic wave propagation, including, but not limited to, aluminum, iron, titanium, copper, steel, brass, glass, polymers, glass fibers, carbon fibers, poly paraphenylene terephthalamide, plastics, ceramics, zinc, chromium, or nickel, and wherein the second structure comprises at least one of aluminum, iron, titanium, polymers, glass fibers, carbon fibers, poly paraphenylene terephthalamide, plastics, ceramics, zinc, chromium, and nickel. Such phononic structures are scalable for various frequency ranges: from sub-micrometer lattices for GHz range acoustic waves to structures of tens of meters for a seismic wave of several hertz.

DETAILED DESCRIPTION

The following disclosure provides many different embodiments, or examples, for implementing different features of the present application. Specific examples of components and arrangements are described below to simplify the present disclosure. These are examples and are not intended to be limiting. The making and using of illustrative embodiments are discussed in detail below. It should be appreciated, however, that the disclosure provides many applicable concepts that can be embodied in a wide variety of specific contexts. In at least some embodiments, one or more embodiment(s) detailed herein and/or variations thereof are combinable with one or more embodiment(s) herein and/or variations thereof.

Various embodiments of the present application relate to a two-dimensional (2D) phononic structure with a user designed one-dimensional (1D) elastic waveguide. FIG. 1 illustrates three exemplary embodiments of a 2-D phononic structure. These phononic structures can be designed in various forms to suit different applications. The truss-like phononic structure in FIG. 1(a) is more commonly seen in civil structures, while the sandwich panel in FIG. 1(b) is more suitable for aerospace structures. These two embodiments are designed for elastic plate wave applications. FIG. 1(c) illustrates another embodiment that is a periodic structure mounted on a substrate for guiding elastic surface waves. The parts in embodiments in FIG. 1(b) and FIG. 1(c) are adhered, welded, glued, or by any other methods, to connect them to ensure that the displacement is continuous. The embodiment in FIG. 1(a) will be used to demonstrate the full approach of the design.

Figure 2:
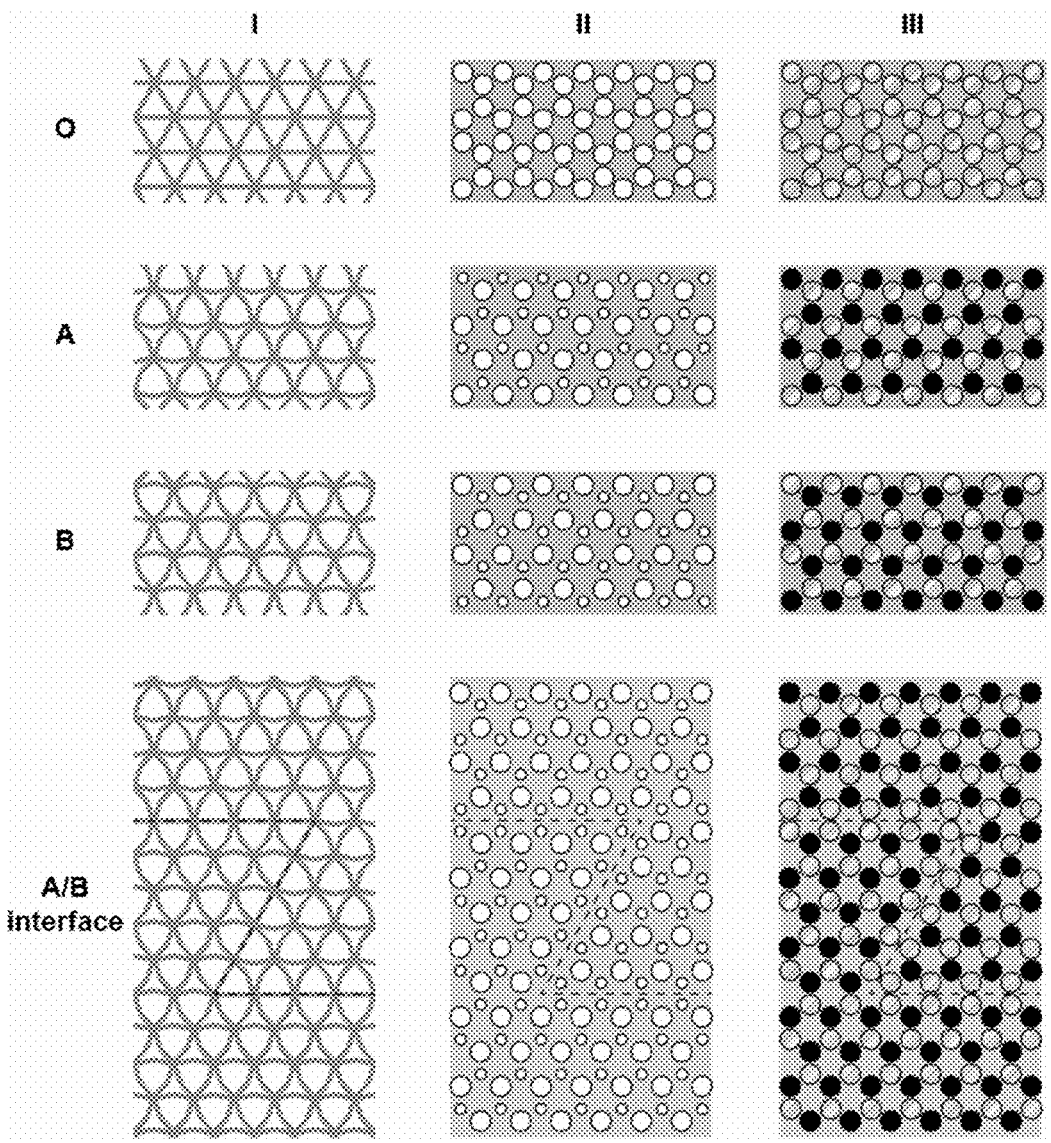
FIG. 2 illustrates various phononic structures in accordance with one or more embodiments.

As illustrated in FIG. 2, various embodiments use phononic lattice having a 3-fold rotation symmetry. In order to activate edge states, one would need phononic structures with broken inversion symmetry (deviated from the symmetric configuration). For convenience purposes, one can classify the phononic structures illustrated in FIG. 2 into the following three states: 1. the reference state O with 3-fold rotation symmetry and inversion symmetry; 2. the A state having 3-fold rotation symmetry, but lacking inversion symmetry; and 3. The B state having 3-fold rotation symmetry, but lacking inversion symmetry as well. The states A and B are mirror images of each other, and both deviate from O.

Three columns (I, II, and III) illustrated in FIG. 2 are three exemplary embodiments of phononic structures achieving the three symmetry states (O, A, and B). As previously mentioned, phononic structure may be built with periodic variation of any mechanical properties as long as certain lattice criteria is satisfied. Column I is the truss-like phononic structure, with O as the reference state, and A, B are phononic structures with broken inversion symmetry obtained by deforming structure O. Such deformation is performed by applying forces on structure O. Column II are phononic structures compose of solid with machined holes. As illustrated, state O has holes arranged in honeycomb lattice, having inversion symmetry. By changing the hole radius alternatively, two inequivalent states A, B are obtained where each of the two inequivalent states lack inversion symmetry. Lastly, column II illustrates that instead of tuning geometry, different material inclusions are used to create the phononic structure. Gray, black, and slashed regions of column II indicate 3 different materials with different mechanical properties. The phononic structures in state O (for all the three columns) possess 3-fold rotation symmetry and inversion symmetry. Moreover, each of the states A and B are inequivalent states with 3-fold rotation symmetry, but lack inversion symmetry. As illustrated, states A and B are mirror images of each other. The last row in FIG. 2 illustrates phononic structures with two sub-domains (i.e. in state A and B), with dashed lines indicating the interfaces.

The deformation of such structures is performed by any of the following actuating methods such as mechanical actuators (i.e. servo motors, linear motors, pressurization etc), thermal actuation (acting on bimetal strip, shape memory alloy, or single solid material under temperature gradient), piezoelectric, electrostrictive, magnetostrictive actuations, or applying electrostatic or magnetic forces. Depending on the embodiment, the amplitude for deformation ranges from 1% to 20% of one period of a periodic structure.

Figure 3:
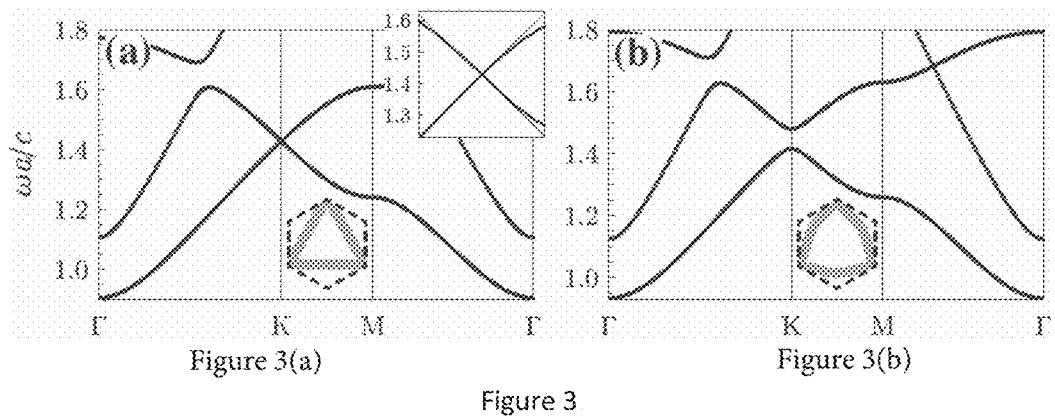
FIG. 3.

The phononic structure is composed of periodic arrays of unit cells. The properties of elastic wave propagation in the phononic structure can be obtained by calculating a dispersion band structure based on the unit cell design. FIGS. 3 (a) and (b) illustrate the calculated dispersion band structures of phononic lattices in FIG. 2 (O and A; column I). As indicated, A and B have the same band structure. For phononic structure O, there is a cone-like dispersion at the symmetry point K in the reciprocal space. For phononic structures A and B, a band gap opens due to symmetry breaking. Therefore in the operating frequency range (the gap range), the phononic structure in state O supports bulk-propagating elastic wave, while A and B do not, that is, elastic waves are forbidden inside lattices A and B. However, phononic structures A and B are of different topological phases (classified by integration of Berry phase in reciprocal space), and edge modes can propagate along the interface of adjacent A and B phononic structures.

Figure 4:
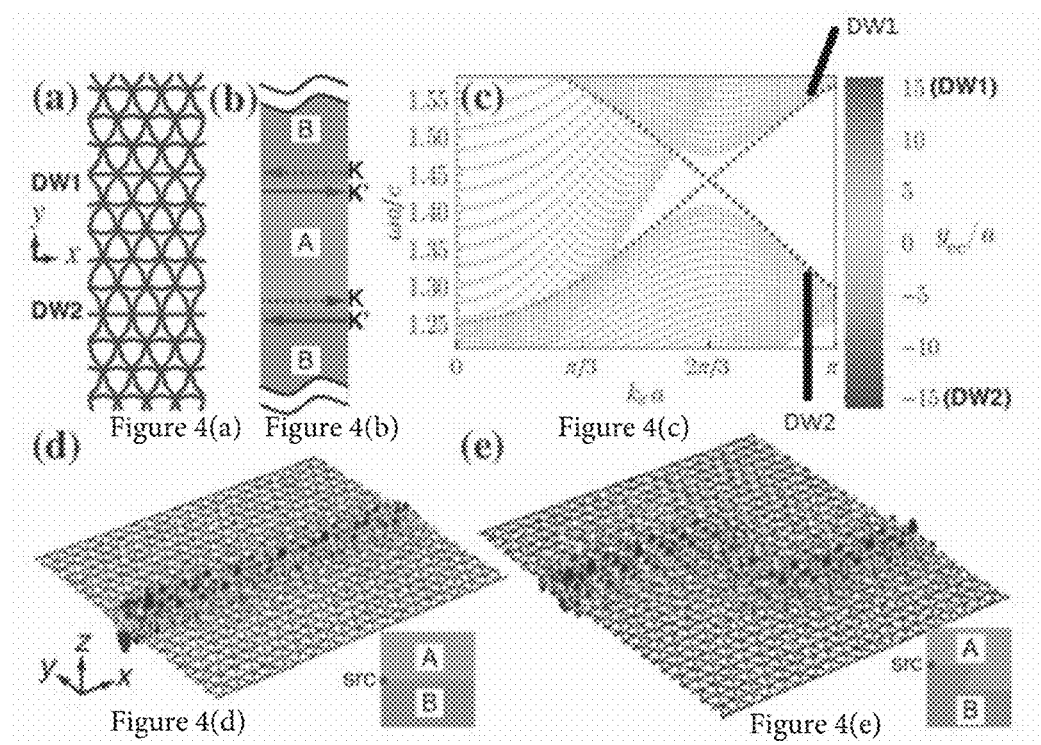
FIG. 4.

The dispersion of A/B interfaces is calculated in FIG. 4 (c). Note that there are two different configurations of A/B domain walls: either B on top of A (indicated by DW1) or vice versa (DW2) (FIG. 4 (a)). It is found that at DW1, the mode shape of the edge state is anti-symmetric with respect to DW1 having zero z-displacement at DW1, while at DW2 the mode shape of the edge state there is symmetric with respect to DW2, with maximum displacement amplitude at DW2. Based on these properties, edge states can also be created (or suppressed) on the boundary of a phononic structure consisting of a single state (A or B). This can happen with proper boundary conditions that include 1. Clamped for zero displacement; and/or 2. Free for zero traction. The existence (or nonexistence) of edge modes for each lattice-boundary condition combinations are illustrated in FIG. 5 (arrows indicate existence of edge states, while crossed out arrows indicates no edge state). FIGS. 6 (a) and (b) illustrate results of numerical experiments confirming the existence and nonexistence of edge states on the top (+y) boundaries of phononic structures in state A and B, respectively. The boundaries are clamped with harmonic point force applied near the boundary.

The above technology can have applications to vibration and noise control of various structures, energy harvesting devices, control of surface acoustic wave for acoustic device design (acoustic circuits, biomedics, telecommunications, etc.), seismic isolation of civil infrastructures.

Figure 7:
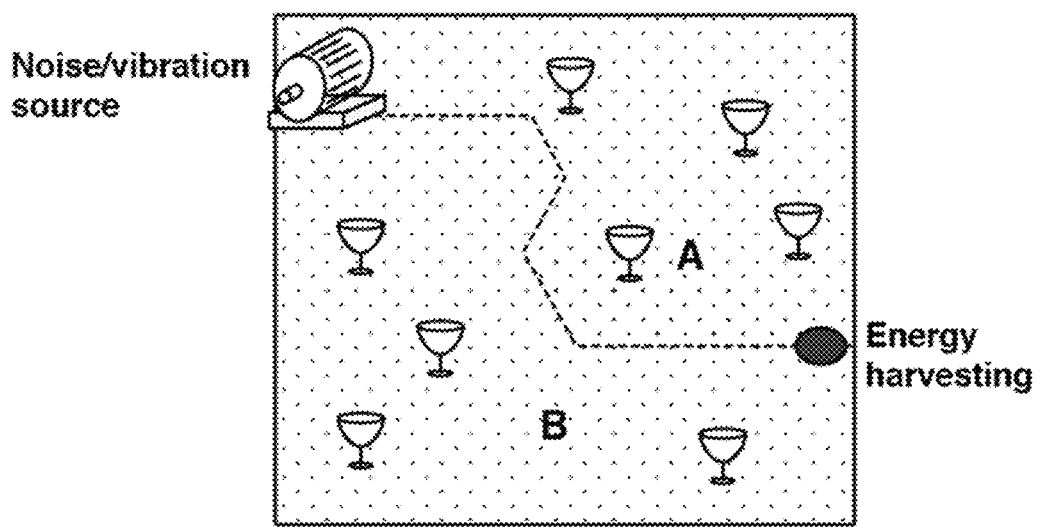
FIG. 7 illustrates a phononic system in accordance with one or more embodiments.
Figure 8:
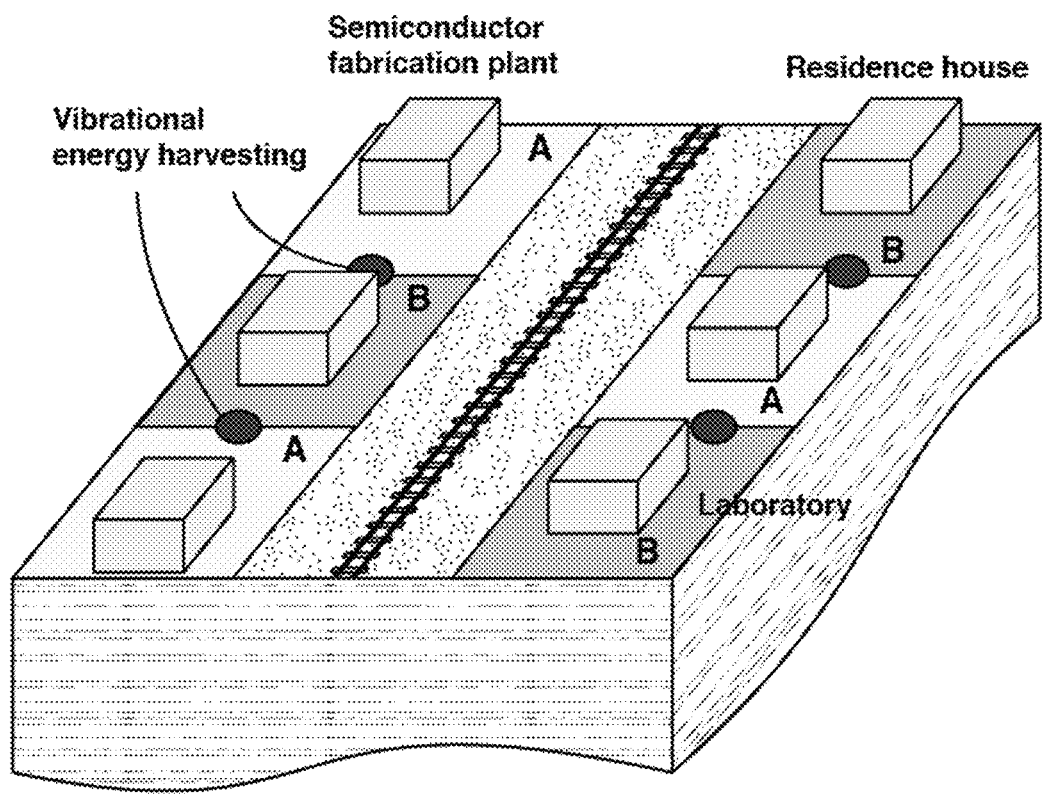
FIG. 8 illustrates a phononic system in accordance with one or more embodiments.

Referring to FIG. 7 and FIG. 8, phononic structures A and B are elastic-wave-forbidden in selected frequency ranges such that acoustic waves cannot propagate. Specific paths can be designed to let the energy through only along selected trajectories. This characteristic can be exploited to isolate an object or to effectively channel and harvest acoustic energy. The phononic structure may be attached to other structures to facilitate its particular function. As illustrated in FIG. 7, an operating motor attached on the phononic structure generates vibration of certain frequency, and the acoustic energy is guided through the A/B interface to the energy harvesting device, while the nearby sensitive objects, indicated by glasses, are free from vibrations. As illustrated in FIG. 8, sensitive buildings near the railroad are protected by the phononic structures which are isolated from the vibration generated by the moving train, while the acoustic energy is located at the interface waveguide, thereby enhancing energy harvesting efficiency.

Figure 9:
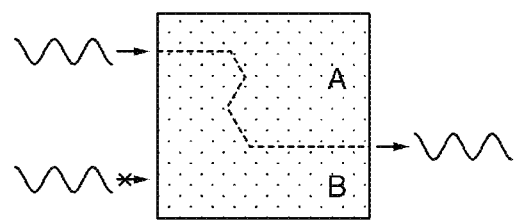
FIG. 9 illustrates a phononic system in accordance with one or more embodiments.
Figure 10:
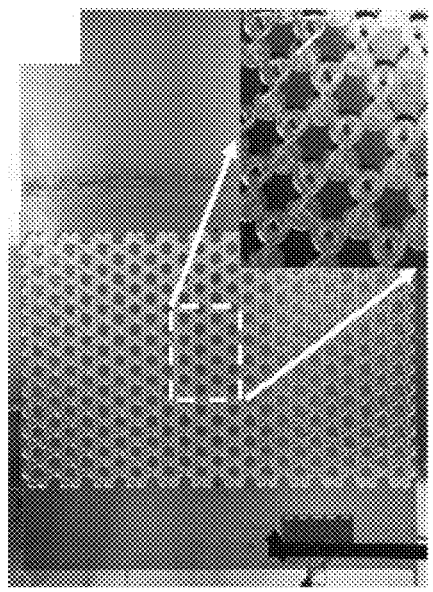
FIG. 10 illustrates a phononic structure lattice in accordance with one or more embodiments.

As illustrated in FIG. 9, one can also create arbitrary waveguides by patterning phononic structures A and B. Therefore, the whole lattice behaves as a multiplexer for acoustic waves, with arbitrary positions of the input/output terminals. This device can be applied, as an example, in the design of acoustic biomedical (e.g. acoustic scalpel) devices or telecommunications (where radio frequency signals are often processed in the form of surface acoustic waves). FIG. 10 illustrates a phononic structure lattice in accordance with one or more embodiments. FIG. 10 illustrates diatomic graphene-like unit cells with their corresponding lattice structures. The unit cell has a lattice period of 27.07 mm, radius (out) of 8.46 mm, and a thickness inside the indentation of 3.045 mm. The plate itself (i.e. the medium) has a thickness of 4.06 mm. The radius (inner) is 2.12 mm.

Example 1

One aspect of the present application relates to a system including a first structure, wherein the first structure lacks space inversion symmetry, and wherein the first structure includes a first elastic lattice. The system further includes a second structure, wherein the second structure lacks space inversion symmetry, and wherein the second structure includes a second elastic lattice. Additionally, the system includes the first structure coupled to the second structure such that the first structure and the second structure have a mirror symmetry to each other. Further, the system includes an interface of the first structure and the second structure, wherein the interface is configured to propagate a unidirectional wave. In at least one embodiment, the vibrational source includes at least one of an engine, a fluid, or a gas. The first elastic lattice and the second elastic lattice are acoustically insulating.

The first elastic lattice has a constraint such that it is configured to generate a plurality of frequency bandgaps, wherein each frequency bandgap of the plurality of frequency bandgaps is obtained around a former Dirac point of the first elastic lattice. The former Dirac point comprises degenerate bands with locally linear dispersion. In various embodiments, the degenerate bands with locally linear dispersion occur around a plurality of symmetry points of a hexagonal reciprocal unit cell of the first elastic lattice. Each symmetry point of the plurality of symmetry points of the hexagonal reciprocal unit of the first structure comprises K and K'.

The second elastic lattice has a constraint such that it is configured to generate a plurality of frequency bandgaps, wherein each frequency bandgap of the plurality of frequency bandgaps is obtained around a former Dirac point of the second elastic lattice. The former Dirac point comprises degenerate bands with locally linear dispersion. In various embodiments, the degenerate bands with locally linear dispersion occur around a plurality of symmetry points of a hexagonal reciprocal unit cell of the second elastic lattice. Each symmetry point of the plurality of symmetry points of the hexagonal reciprocal unit of the second structure comprises K and K'.

In some embodiments, the first structure and the second structure are monolithic. In some embodiments, the first structure and the second structure are coupled to each other by at least one of the following ways: glued, jointed, or welded.

In some embodiments, lack of space inversion of the first elastic lattice is functionally graded or constant. In some embodiments, lack of space inversion of the second elastic lattice is functionally graded or constant. In at least one embodiment, the first structure includes at least one aluminum, iron, titanium, copper, steel, brass, glass, polymers, glass fibers, carbon fibers, poly paraphenylene terephthalamide, plastics, ceramics, zinc, chromium, or nickel, and wherein the second structure comprises at least one of aluminum, iron, titanium, polymers, glass fibers, carbon fibers, poly paraphenylene terephthalamide, plastics, ceramics, zinc, chromium, or nickel.

In at least one embodiment, the second structure includes at least one aluminum, iron, titanium, copper, steel, brass, glass, polymers, glass fibers, carbon fibers, poly paraphenylene terephthalamide, plastics, ceramics, zinc, chromium, or nickel, and wherein the second structure comprises at least one of aluminum, iron, titanium, polymers, glass fibers, carbon fibers, poly paraphenylene terephthalamide, plastics, ceramics, zinc, chromium, or nickel.

In some embodiments, the first structure has a thickness which is approximately $1/10^{th}$ or lower of a characteristic in-plane dimension. The characteristic in-plane dimension includes a length or a width.

In some embodiments, the second structure has a thickness which is approximately $1/10^{th}$ or lower of a characteristic in-plane dimension. The characteristic in-plane dimension includes a length or a width.

In some embodiments, the first structure further includes a top layer and a bottom layer, wherein the top layer is connected to a top surface of the first structure, and the bottom layer is connected to a bottom surface of the first structure. In some embodiments, the second structure further comprises a top layer and a bottom layer, wherein the top layer is connected to a top surface of the second structure, and the bottom layer is connected to a bottom surface of the second structure.

The geometry of the first elastic lattice and the second elastic lattice are made such that the geometry is configured to generate hexagonal reciprocal unit cell.

The lattices in the above structures can be achieved by deformations. The deformation of such structures is performed by any of the following actuating methods such as mechanical actuators (i.e. servo motors, linear motors, etc), thermal actuation (acting on bimetal strip, shape memory alloy, or single solid material under temperature gradient), piezoelectric, electrostrictive, magnetostrictive actuations, or applying electrostatic or magnetic forces. Depending on the embodiment, the amplitude for deformation ranges from 1% to 20% of one period of a periodic structure. In some embodiments, the above structures are further pressurized so as to ensure that the geometry is configured to generate hexagonal reciprocal unit cell. In some embodiments, the above structures are cut/deformed in a way that the final structure would have a geometry that is configured to generate hexagonal reciprocal unit cell.

The invention is inclusive of combinations of the aspects described herein. References to "a particular aspect" and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A system comprising:
   a vibration source;
   a first structure, wherein the first structure lacks space inversion symmetry, wherein the first structure comprises a first elastic lattice;
   a second structure, wherein the second structure lacks space inversion symmetry, wherein the second structure comprises a second elastic lattice;
   wherein the first structure is coupled to the second structure;
   wherein each of the first elastic lattice and the second elastic lattice have a mirror symmetry to each other; and
   wherein an interface of the first structure and the second structure is configured to propagate a unidirectional wave from the vibration source.

2. The system of claim 1, wherein the vibrational source comprises at least one of an engine, a fluid, a gas.

3. The system of claim 1, wherein the first elastic lattice is configured to generate a plurality of frequency bandgaps, wherein each frequency bandgap of the plurality of frequency bandgaps is obtained around a former Dirac point.

4. The system of claim 3, wherein the former Dirac point comprises degenerate bands with locally linear dispersion.

5. The system of claim 4, wherein the degenerate bands with locally linear dispersion occur around a plurality of symmetry points of a hexagonal reciprocal unit cell of the first elastic lattice.

6. The system of claim 5, wherein each symmetry point of the plurality of symmetry points of the hexagonal reciprocal unit of the first structure comprises K and K'.

7. The system of claim 1, wherein the second elastic lattice is configured to generate a plurality of second frequency bandgaps, wherein each second frequency bandgap of the plurality of second frequency bandgaps is obtained around a former Dirac point of the second elastic lattice.

8. The system of claim 7, wherein the former Dirac point comprises degenerate bands with locally linear dispersion of the second elastic lattice.

9. The system of claim 8, wherein the degenerate bands with locally linear dispersion occur around a plurality of symmetry points of a hexagonal reciprocal unit cell of the second elastic lattice.

10. The system of claim 9, wherein each symmetry point of the plurality of symmetry points of the hexagonal reciprocal unit of the second elastic lattice comprises K and K'.

11. The system of claim 1, wherein the first structure is coupled to the second structure comprises:
    the first structure glued, jointed, or welded to the second structure.

12. The system of claim 1, wherein the first structure and the second structure are monolithic.

13. The system of claim 1, wherein the first elastic lattice and the second elastic lattice are acoustically insulating.

14. The system of claim 1, wherein a lack of space inversion of the first elastic lattice is functionally graded or constant, and wherein a lack of space inversion of the second elastic lattice is functionally graded or constant.

15. The system of claim 1, wherein a lack of space inversion of the first elastic lattice is functionally graded or constant, or wherein a lack of space inversion of the second elastic lattice is functionally graded or constant.

16. The system of claim 1, wherein the first structure comprises at least one aluminum, iron, titanium, copper, steel, brass, glass, polymers, glass fibers, carbon fibers, poly paraphenylene terephthalamide, plastics, ceramics, zinc, chromium, or nickel, and wherein the second structure comprises at least one of aluminum, iron, titanium, polymers, glass fibers, carbon fibers, poly paraphenylene terephthalamide, plastics, ceramics, zinc, chromium, or nickel.

17. The system of claim 1, wherein the first structure has a thickness, wherein the thickness is approximately 1/10th or lower of a characteristic in-plane dimension.

18. The system of claim 17, wherein the characteristic in-plane dimension comprises a length or a width.

19. The system of claim 1, wherein the first structure further comprises a top layer and a bottom layer, wherein the top layer is connected to a top surface of the first structure, and the bottom layer is connected to a bottom surface of the first structure.

20. The system of claim 1, wherein the second structure further comprises a top layer and a bottom layer, wherein the top layer is connected to a top surface of the second structure, and the bottom layer is connected to a bottom surface of the second structure.

21. The system of claim 1, wherein the first elastic lattice comprises a geometry, wherein the geometry is configured to generate hexagonal reciprocal unit cell.

22. The system of claim 1, wherein the frequency second elastic comprises a geometry, wherein the geometry is configured to generate hexagonal reciprocal unit cell.

* * * * *